Feb. 14, 1967 P. E. BEAM, JR 3,304,008

TEMPERATURE RESPONSIVE ROCKET NOZZLE COOLING SYSTEM

Filed June 24, 1963

INVENTOR.
Paul E. Beam, Jr.
BY
Paul Fitzpatrick
ATTORNEY

United States Patent Office 3,304,008
Patented Feb. 14, 1967

3,304,008
TEMPERATURE RESPONSIVE ROCKET NOZZLE COOLING SYSTEM
Paul E. Beam, Jr., Indianapolis, Ind., assignor to General Motors Corporation, Detroit, Mich., a corporation of Delaware
Filed June 24, 1963, Ser. No. 290,886
2 Claims. (Cl. 239—127.3)

This invention relates to rocket engine nozzles and, more particularly, it relates to a temperature-responsive valve for a cooling system for a rocket engine nozzle liner.

In general, the preferred embodiment of the invention is a cooling system for a rocket engine nozzle liner wherein the coolant flow to the nozzle liner surface is controlled by a temperature-sensitive valve, which is responsive to the temperature of the nozzle liner. The nozzle liner is surrounded by a coolant cavity which is supplied with coolant by a coolant passage. The coolant passage has an orifice normally blocked by a movable pin. The pin is secured at its other end in a block of material which melts at a predetermined temperature and allows the pin to move out of the orifice, thereby allowing the coolant to flow to the nozzle liner.

Therefore, it is the object of this invention to provide a temperature-responsive actuating mechanism.

It is a further object of this invention to provide a temperature-responsive valve which is adapted for use in the cooling system of a rocket engine nozzle liner.

Figure 1:
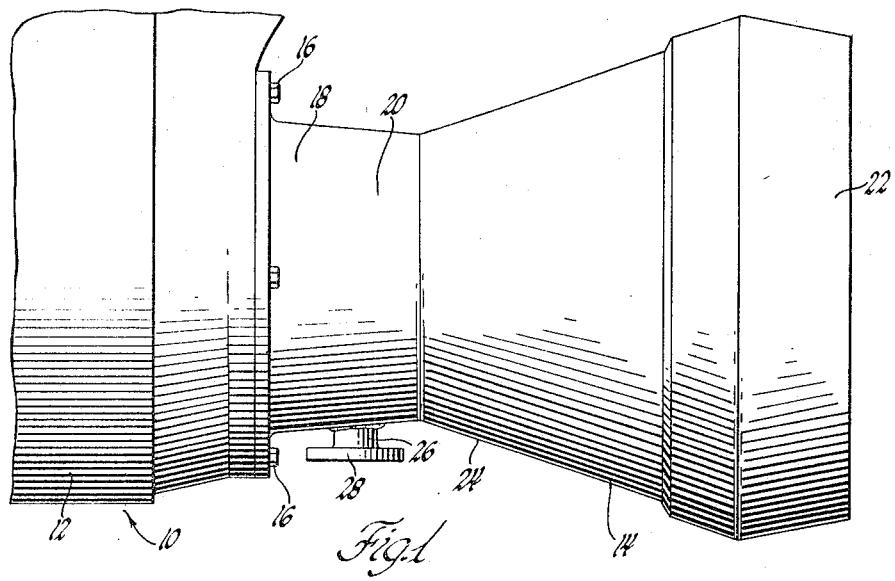
Figure 2:
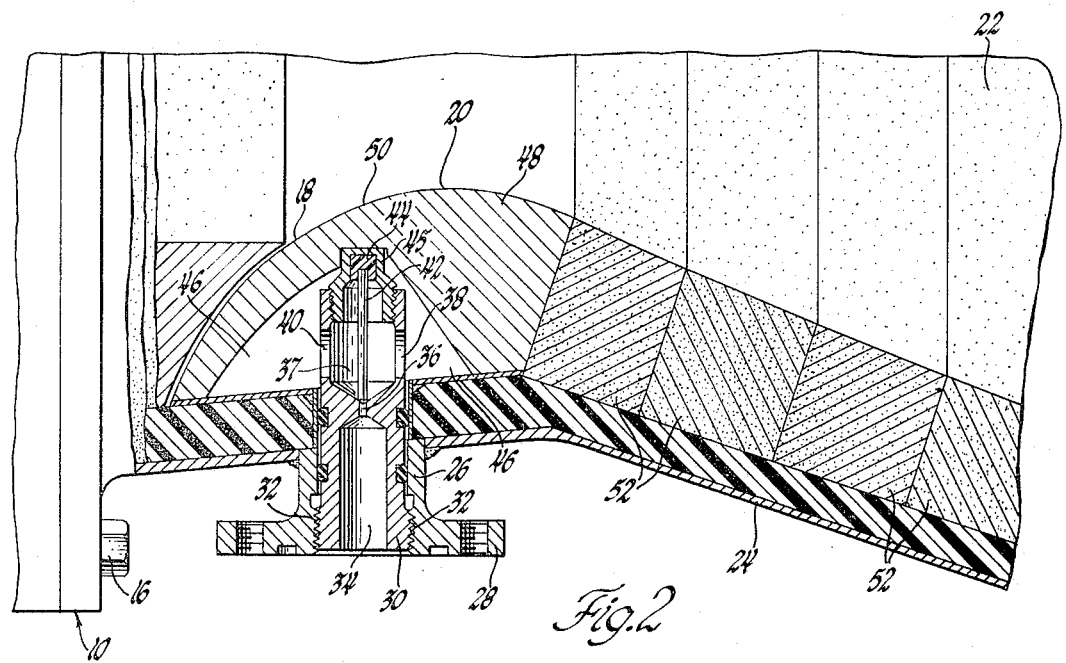

Other objects, features and advantages of the subject invention will become apparent upon reference to the succeeding detailed description and the drawings illustrating the preferred embodiment thereof, wherein:

FIGURE 1 is a plan view of a rocket engine incorporating the subject invention; and FIGURE 2 is an enlarged view of the cooling system as installed in the rocket engine of FIGURE 1.

More particularly, FIGURE 1 shows a rocket engine 10, which includes a combustion chamber 12 and an exhaust nozzle 14. The exhaust nozzle 14 may be attached to the combustion chamber 12 by any suitable means, such as the bolts 16. In the preferred embodiment, the exhaust nozzle 14 is of the converging-diverging type, having a converging portion 18, a venturi or throat portion 20, and a diverging exit cone 22. The nozzle has an outer housing 24 which may be constructed of any suitable material, such as steel. The cooling system valve is housed within an annular sleeve or boss 26 with a flange 28, which is fixed by sutiable means to the nozzle housing 24.

The cooling system is shown in detail in FIGURE 2 and it includes a valve body 30 which is slidingly received by the sleeve 26, and its end portion is threaded within the sleeve at 32. The valve body 30 is seen to have a coolant flow passage 34 which converges to an orifice 36, and then diverges into a chamber 37 which has two coolant outlets 38 and 40. The orifice portion 36 of the coolant passage is blocked by a pin 42. This pin 42 is held at its other end in a block 44 comprising a substance with a melting temperature far below the melting temperature of the nozzle liner. The substance comprising block 44 will be selected in accordance with the temperature at which it is desired to have the coolant released. For example, aluminum could be used if the desired temperature is 1300° F.; silver could be used for 1800° F.; and steel for 3000° F. This block 44 is held within a cap body 45 which is threadingly fixed to the valve body 30. Adjacent to the coolant outlets 38 and 40 is an annular coolant cavity 46 which surrounds the throat portion 20 of the nozzle liner. The nozzle liner 48 will be made of a porous material such, for example, as porous tungsten, so that when the coolant reaches the coolant cavity 46 it can diffuse through the liner 48 to the inner nozzle surface 50. Coolant substances frequently used in such cooling systems include Freon, ammonia, water, and lithium.

Thus, it is seen that when combustion occurs in the combustion chamber 12 and the hot exhaust gases begin to pass through the exhaust nozzle 14 the nozzle liner 48 will heat up very rapidly and, in order to keep it intact, a coolant flow to this portion of the nozzle will be required. Now when the temperature at which a coolant flow is needed has been determined, a material such as previously described with a melting temperature close to this temperature at which a coolant flow is desired will be selected to be used as the pin holding block 44. Therefore, when the nozzle liner 48 heats to a predetermined temperature the block material 44 will melt, thereby allowing the pin member 42 to move out of the orifice 36. The coolant then will flow into the coolant cavity 46 and diffuse through the porous tungsten nozzle liner 48 to cool the nozzle liner surface 50. Thus, it is seen that the selection of the material to be used in the pin holding block 44 will determine the temperature at which the coolant will reach the coolant cavity 46 and thereafter cool the nozzle liner.

It is not felt that the remaining details of the nozzle itself are important to the invention, therefore, they will not be described in detail. Suffice it to say that in the preferred embodiment the nozzle throat liner 48 is made of porous tungsten and is followed by a series of carbon rings 52. The valve body 30 and the pin member 42 maye be made of steel. It is to be further noted that the coolant passage 34 will be connected to a coolant source by any suitable conduit bolted to flange 28 (not shown).

It should be understood that the materials selected for the coolant substance and the meltable block 44 will be dependent upon the circumstances of the operating environment and will be a matter of design rather than an essential part of this invention.

Although the subject invention has been illustrated in connection with its use in the coolant system of a rocket engine nozzle liner, it should be obvious to those skilled in the arts to which it pertains that it would have use in any device wherein a heat-responsive valve mechanism is desired, and that many changes and modifications may be made thereto without departing from the scope of the invention.

What is claimed is:
1. A temperature-responsive cooling system for a rocket engine nozzle comprising:
   a porous liner for said nozzle;
   a coolant chamber surrounding said nozzle liner;
   a valve body providing a coolant passage into said coolant chamber including a coolant inlet, a coolant outlet, and a valve seat therebetween, said coolant outlet opening into said coolant chamber;
   a valve body cap threadingly attached to said valve body and positioned adjacent to said nozzle liner;
   a pin means having one end thereof seated in said valve seat to restrict the flow of coolant through said valve body;
   a block of meltable material disposed within said valve body cap, said meltable material holding said pin means in its seated position to restrict the flow of said coolant through said valve body, and said meltable material melting when the valve body cap reaches a predetermined temperature to release said pin means from its seated position thereby facilitating the flow of coolant through said valve body into said cooling chamber.

2. A temperature-responsive cooling system for a rocket engine nozzle comprising:
- a porous tungsten liner for said nozzle;
- a coolant chamber surrounding said tungsten liner;
- a valve body providing a coolant passage into said coolant chamber including a coolant inlet, a coolant outlet, and a valve seat therebetween, said coolant outlet opening into said coolant chamber;
- a valve body cap threadingly attached to said valve body and positioned adjacent to said nozzle liner;
- a pin means having one end thereof seated in said valve seat to restrict flow of coolant through said valve body;
- and a block of meltable material located within said valve cap, said meltable material holding in said pin means in its seated position to restrict the flow of coolant through said valve body, and said meltable material melting when said valve body cap reaches a predetermined temperature to release said pin means from its seat position to allow the coolant flow through said valve body into said coolant chamber and through said porous nozzle liner to thereby cool the inner surface of said nozzle liner.

References Cited by the Examiner

UNITED STATES PATENTS

| | | | |
|---|---|---|---|
| 2,671,461 | 3/1954 | Hebert | 137—72 |
| 2,741,085 | 4/1956 | Prentiss | 60—39.09 |
| 2,962,221 | 11/1960 | Kunz | 60—35.6 |
| 3,049,877 | 8/1962 | Sherman | 60—35.6 X |
| 3,069,847 | 12/1962 | Vest | 60—39.66 X |
| 3,153,320 | 10/1964 | Prosser | 60—39.66 X |

FOREIGN PATENTS 584,439   10/1959   Canada.

CARLTON R. CROYLE, *Primary Examiner.*